US009547762B2

(12) United States Patent
Lu et al.

(10) Patent No.: US 9,547,762 B2
(45) Date of Patent: Jan. 17, 2017

(54) AUTHENTICATING USER AND LAUNCHING AN APPLICATION ON A SINGLE INTENTIONAL USER GESTURE

(71) Applicant: Google Inc., Mountain View, CA (US)

(72) Inventors: Hao Lu, Sunnyvale, CA (US); Yang Li, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/673,581

(22) Filed: Mar. 30, 2015

(65) Prior Publication Data

US 2016/0292410 A1 Oct. 6, 2016

(51) Int. Cl.
*G06F 7/04* (2006.01)
*G06F 21/36* (2013.01)
*G06F 3/0488* (2013.01)
*G06F 21/32* (2013.01)
*G06K 9/00* (2006.01)

(52) U.S. Cl.
CPC ........... *G06F 21/36* (2013.01); *G06F 3/04883* (2013.01); *G06F 21/32* (2013.01); *G06K 9/00087* (2013.01); *G06F 2203/04101* (2013.01); *G06F 2203/04104* (2013.01); *G06K 2209/03* (2013.01)

(58) Field of Classification Search
CPC ........ G06F 21/32; G06F 1/3278; G06F 21/31; G06F 21/35; G06F 21/36; G06F 21/606; G06F 21/62; G06F 2221/2137; G06F 3/017; G06F 3/0412; G06F 3/0416; G06F 3/1454; A61N 1/36046; H04W 12/06
USPC .......................................................... 726/19
See application file for complete search history.

(56) References Cited

U.S. PATENT DOCUMENTS

| 9,110,561 | B2* | 8/2015 | Moore | G06F 3/0481 |
| 2008/0092245 | A1* | 4/2008 | Alward | G06F 21/316 |
| | | | | 726/28 |
| 2012/0089952 | A1* | 4/2012 | Song | G06F 1/1684 |
| | | | | 715/863 |

(Continued)

OTHER PUBLICATIONS

Lü and Li, "Gesture On: Enabling Always-On Touch Gestures for Fast Mobile Access from the Device Standby Mode," CHI 2015: ACM Conference on Human Factors in Computing Systems, Apr. 2015, 10 pages.

(Continued)

*Primary Examiner* — Kambiz Zand
*Assistant Examiner* — Abiy Getachew
(74) *Attorney, Agent, or Firm* — Fish & Richardson P.C.

(57) ABSTRACT

Methods, systems, and apparatus, including computer programs encoded on computer storage media, for combining authentication and application shortcut. An example method includes detecting, by a device having a touchscreen, a gesture by a user on the touchscreen while the device is in a sleep mode; classifying the gesture, by the device, as an intentional gesture or an accidental gesture; maintaining the device in the sleep mode if the gesture is classified as an accidental gesture; responsive to determining, by the device, that the gesture matches one or more confirmed gestures stored on the device based at least in part on a set of predefined criteria, if the gesture is classified as an intentional gesture: recognizing the user as authenticated; and without requiring additional user input, selecting an application, from a plurality of different applications, according to the gesture and launching the application on the device.

22 Claims, 4 Drawing Sheets

(56) References Cited

U.S. PATENT DOCUMENTS

2012/0191993 A1* 7/2012 Drader .................. G06F 1/3215
713/320
2012/0268397 A1 10/2012 Lee et al.
2014/0268397 A1* 9/2014 Zhang ................ G11B 20/1217
360/48

OTHER PUBLICATIONS

Johnson, "Always-On Touch Gestures Save Time & Battery," EE Times [online], Sep. 3, 2014 [retrieved on Mar. 10, 2015 ]. Retrieved from the Internet: http://www.eetimes.com/document.asp?doc_id—1323713, 3 pages.
International Search Report and Written Opinion in International Application No. PCT/US2015/064561, mailed Apr. 12, 2016, 14 pages.

* cited by examiner

AUTHENTICATING USER AND LAUNCHING AN APPLICATION ON A SINGLE INTENTIONAL USER GESTURE

TECHNICAL FIELD

This specification relates to authenticating users and launching applications on devices with gesture-based user interfaces.

BACKGROUND

User authentication and application launching are often implemented as separate processes, each requiring different user inputs. Also, every time a user attempts an authentication on a device, the device needs to be activated from a sleep or standby mode, which will consume power.

SUMMARY

In general, this specification describes techniques for authenticating a user and launching a user-selected application in response to and in accordance with a single intentional user gesture.

In general, one innovative aspect of the subject matter described in this specification can be embodied in methods that include the actions of detecting, by a device having a touchscreen, a gesture by a user on the touchscreen while the device is in a sleep mode; classifying the gesture, by the device, as an intentional gesture or an accidental gesture; maintaining the device in the sleep mode if the gesture is classified as an accidental gesture; responsive to determining, by the device, that the gesture matches one or more confirmed gestures stored on the device based at least in part on a set of predefined criteria, if the gesture is classified as an intentional gesture: recognizing the user as authenticated; and without requiring additional user input, selecting an application, from a plurality of different applications, according to the gesture and launching the application on the device.

Other embodiments of this aspect include corresponding computing systems, apparatus, and computer programs recorded on one or more computing storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Particular embodiments of the subject matter described in this specification can be implemented so as to realize one or more of the following advantages. Power consumption may be reduced: a user device remains in a sleep mode, which consumes less power compared to an active mode, when only accidental gestures are detected. User input required to securely launch an application may be reduced: a single user gesture can suffice to not only authenticate a user, but also launch a user-selected application.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

The implementations described in this specification provide various technical solutions to combine user authentication and application selection shortcuts in accordance with a single intentional user gesture by (1) detecting and disregarding accidental user gestures on a device's touchscreen without transitioning the device from a reduced power consumption mode, e.g., a sleep mode, into an increased power consumption mode, e.g., an active mode, and (2) securely launching an application on the device upon detecting an intentional user gesture that matches a predefined user gesture.

For example, a smartphone can maintain a gesture detection component, e.g., a software module, a hardware unit, or a combination of both, in an active detection mode, but other more power-consuming components, e.g., the touchscreen, the processor, and the main memory, in a sleep or standby mode.

When a user swipes two fingers across the smartphone's touchscreen, the gesture detection component classifies—without activating the other more power-consuming components from the sleep mode—this two-finger swipe gesture as either an intentional user gesture or an accidental gesture. For example, the gesture detection component tries to determine whether the user making the two-finger swipe gesture is trying to unlock the smartphone and launch a map application or whether the user has accidentally swiped her fingers on the touchscreen while grabbing the smartphone.

In some cases, the gesture detection component makes this classification based on a set of predefined criteria, e.g., the orientation of the smartphone when the swipe occurred, the movement speed or acceleration of the smartphone when the swipe occurred, and the total number of fingers involved in making the swipe.

For instance, if the smartphone was placed upside down when the swipe occurred, then it is more likely that the swipe was accidental, based on the assumption that a user is more likely to make intentional gesture when a device is in an upright position. For another instance, if the smartphone was moving at an eight-mile per hour speed when the swipe occurred, then it is more likely that the swipe was accidental, based on the assumption that a user is more likely to make intentional gestures when keeping a device still. For a third instance, if the swipe was made with four fingers, then it is more likely that the swipe was accidental, based on the assumption that a user is more likely to make intentional gestures using two or fewer fingers, given the size of the touchscreen relative to that of the user's fingers.

Based on one or more of these predefined criteria, if the gesture detection component classifies the user's two-finger swipe on the touchscreen as accidental, the gesture detection component disregards the swipe gesture without activating some of the smartphone components that are in a sleep mode, to keep the power consumption low.

If, however, the gesture detection component classifies the user's two-finger swipe as intentional, the gesture detection component activates other smartphone components on an as-needed basis.

For example, upon detecting an intentional gesture, the gesture detection component, in some cases, activate a gesture-based authentication component from the sleep mode, which can further determine whether to unlock the smartphone based on the two-finger swipe. If the authentication is successful, the gesture detection component in some cases next activates an application launching component from the sleep mode, which then determines which one of the several different applications resident on the smartphone may be launched based on the two-finger swipe.

The gesture-based authentication component, in some cases, unlocks the smartphone if the two-finger swipe matches a user gesture that has been confirmed as sufficient to unlock the smartphone, e.g., unlocking the smartphone after detecting an "L" shape gesture using 2 fingers.

The application launching component, in some cases, selectively launches an application, among several different applications, if the two-finger swipe matches a user gesture that has been confirmed as a shortcut to launch the application, e.g., launching an email application, e.g., as opposed to a map application, after detecting an "L" shape gesture using two fingers.

In these ways, added user convenience is provided and power consumption maintained low: because a user is not required to provide separate inputs for authentication and application launching; and smartphone components are kept in sleep mode and selectively activated on an as-needed basis.

These technical solutions may be particularly advantageous when implemented on mobile devices, e.g., smartphones or tablet computers, where power consumption is a more prominent issue and user authentications are more frequently attempted.

Figure 1:
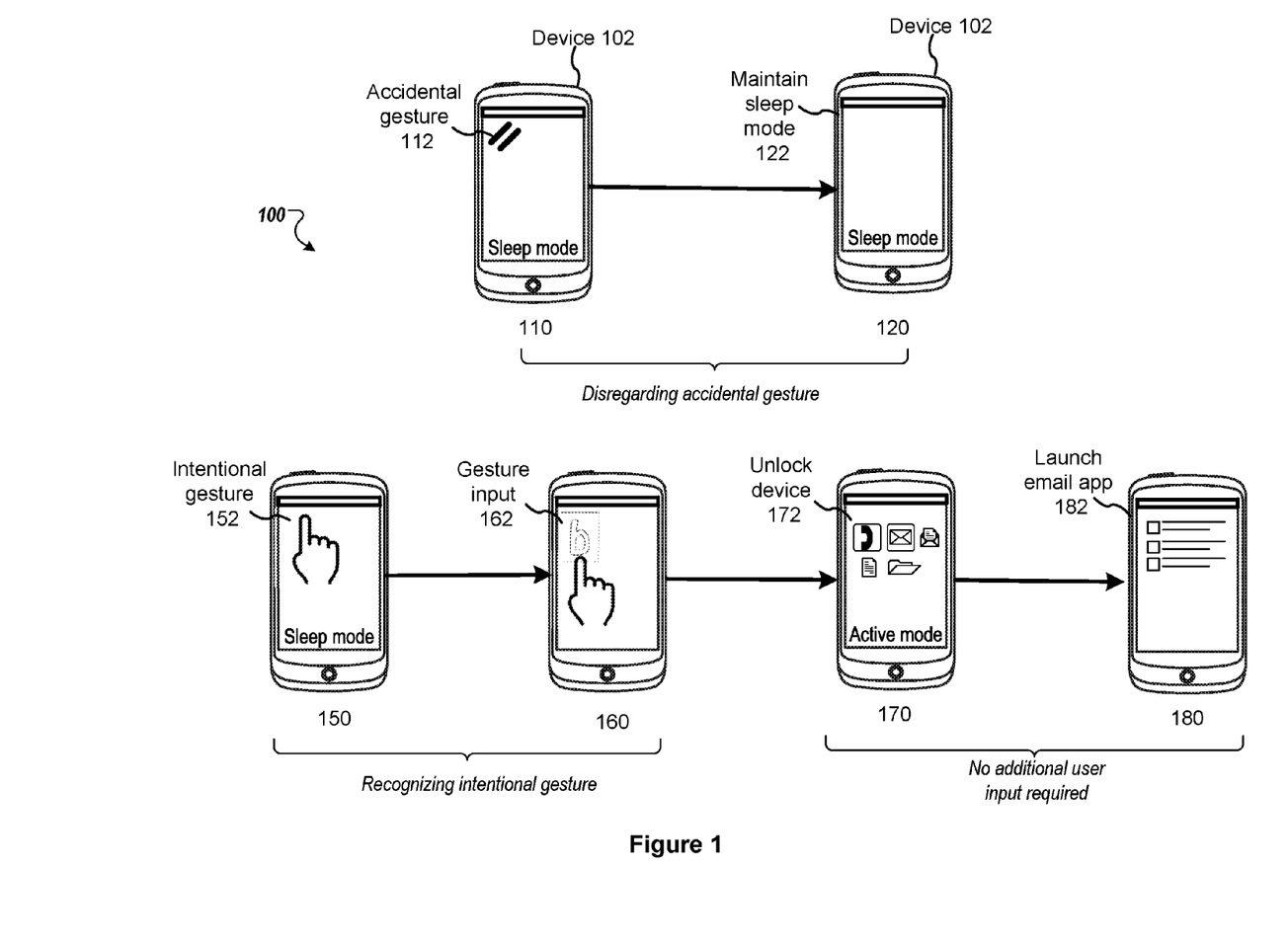
FIG. 1 is a block diagram illustrating an example process for authenticating a user and launching a user-selected application responsive to a single intentional user gesture.

FIG. 1 is a block diagram illustrating an example process 100 for user authentication and application launching in response to a single intentional user gesture.

The process begins with a device 102 in a sleep or standby mode (110).

The device is locked when in the sleep mode and requires a successful user authentication to unlock. For example, a user may need to provide passcode, fingerprint identification, voice verification, or touchscreen gesture, in order to access the device.

In some implementations, a device or a component within the device consumes less power when placed in the sleep mode. For example, when a device 102 is in a sleep mode, a processor in the device 102 is placed in an idle mode or the device's display or touchscreen is dimmed or turned off.

A gesture detection component within the device 102 is maintained in an active mode to detect user gesture on the device's touchscreen, while some other components of the device 102 is in a sleep mode. In some implementations, the gesture detection component is implemented as a low power consumption digital signal processor (DSP). In other implementations, the gesture detection component is implemented as a software program, e.g., a touchscreen driver program, running in the background while the device's touchscreen is dimmed.

Based on a set of predefined criteria, the gesture detection component sometimes classifies a gesture detected on the touchscreen of the device 102 as an accidental gesture 112.

The gesture detection component does not activate the device into an active mode, after detecting an accidental gesture. In some implementations, when activated, a device or a device component is placed on an increased power consumption level.

Figure 2:
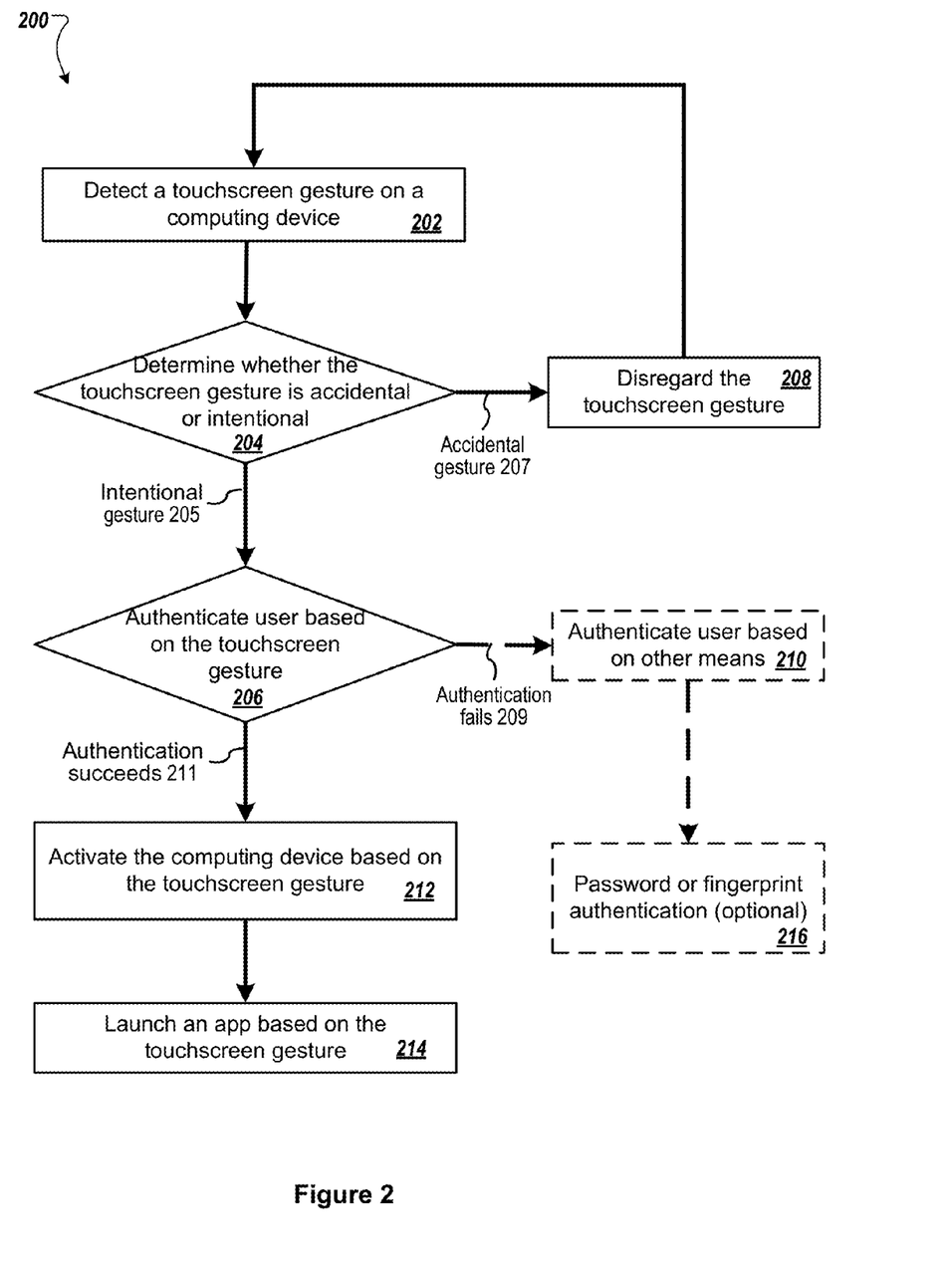
FIG. 2 is a flow diagram illustrating an example process for detecting and disregarding accidental gestures, as well as authenticating a user and launching an application responsive to a single intentional gesture.
Figure 3:
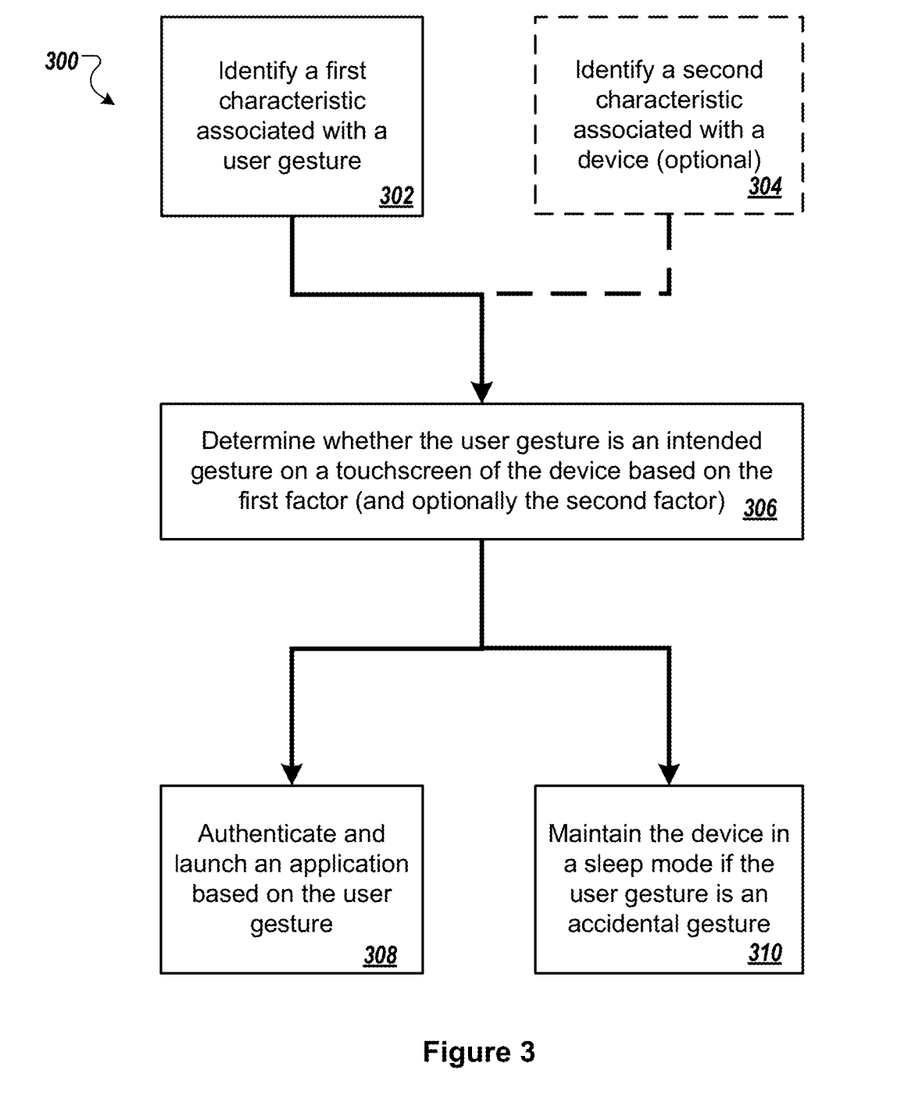
FIG. 3 is a flow diagram illustrating an example process for detecting and disregarding accidental gestures based on predefined criteria.

Techniques for classifying a user gesture as an intentional user gesture or an accidental user gesture are described in more detail in reference to FIG. 2 and FIG. 3.

If the gesture detection component classifies a gesture as an intentional gesture 152, the gesture detection component activates an authentication component of the device from the sleep mode.

If the authentication component recognizes one or more characteristics, e.g., shape, speed, or location, of the intentional gesture 152 and, based on these characteristics, compares the gesture 152 with a set of confirmed gestures, the device can determine whether the user providing the gesture can be authenticated on the device 102.

If the authentication component determines that the user can be authenticated on the device, it unlocks the device 102.

In some implementations, as part of a successful authentication, the authentication component also activates an application launching component from the sleep mode.

In some other implementations, as part of a successful authentication, the authentication component optionally activates one or more additional components of the device from the sleep mode into the active mode, e.g., increasing the brightness of the touchscreen and placing the processor in a working mode from an idle mode to enable faster processing of user tasks.

Based on one or more recognized characteristics, e.g., shape, speed, or location, of the intentional gesture 152, the application launching component selectively launches one or more applications, from a set of different applications. For example, based on the shape of the intentional gesture 152, the application launching component launches an email application 182 rather than a map application.

Note that these actions do not require additional user input, other than the intentional gesture 152. These techniques can be advantageous, as a single intentional gesture suffices to both authenticate a user on the device and launch an application as predefined by the user.

FIG. 2 is a flow diagram illustrating an example process 200 for detecting and disregarding accidental gestures, as well as authenticating a user and launching an application in response to and in accordance with a single intentional gesture.

For convenience, the process 200 will be described as being performed by a device having a touch screen, one or more processors, and memory for storing executable instruction for execution by the one or more processors. For example, the device 400 shown in FIG. 4, appropriately programmed in accordance with this specification, can perform the process 200.

The device detects a gesture by a user on the touchscreen while the computing device is in a sleep mode (step 202). The computing device can be, e.g., a smartphone, a tablet computer, or a desktop or notebook computer, with a touchscreen.

In some implementations, the device maintains a blank screen on its touchscreen when detecting user gestures, e.g., to reduce power consumption. Maintaining a blank screen may be particularly advantageous when accidental gestures frequently occur.

In some other implementations, when in sleep mode, the device provides one or more visual aids to facilitate gesturing on the touchscreen. For example, the device, without transitioning the touchscreen into a fully lit mode, may display a gesture trail to guide the user to complete the instant gesture or additional gestures. These visual feedbacks from the device inform a user not only that the device is in a working mode, but also what gesture it has detected.

After detecting the gesture, the computing device next determines whether to classify the gesture as an accidental gesture or as an intentional gesture (step 204). The computing device can make this determination by comparing the gesture against a set of predefined criteria.

If the device classifies the gesture as an accidental user gesture (207), the device disregards the gesture (step 208) and maintains or returns to the sleep mode. The set of predefined criteria may include, for example, one or more characteristics associated with the gesture or the device.

In some cases, when in or maintaining a sleep mode, the device maintains a blank screen on the touchscreen and one or more components of the computing device other than the touchscreen in a reduce power consumption mode, e.g., an idle mode.

If the gesture is classified as an intentional user gesture (205), the process 200 continues to the authentication step (step 206).

The device authenticates the user on the computing device by matching the intentional gesture to one or more confirmed gestures (step 206).

In some implementations, the intentional user gesture identifies an alphanumeric character, e.g., a letter "B" or a number "4." In some implementations, the device matches an alphanumeric gesture against predefined alphanumeric values using a pre-trained handwriting recognition module that recognize whether handwriting embodied in an alphanumeric gesture matches handwritings of an authenticated user.

In some implementations, the intentional user gesture identifies a predefined shape, e.g., a triangle shape or a circle shape. In some implementations, the device matches shape gestures against a set of predefined shape gesture templates, which an authenticated user can customize.

In some implementations, authenticating a user on a device includes determining whether to unlock the device in accordance with one or more inputs, e.g., a finger gesture, a manually entered passcode, or a voice identification, provided by the user. For example, if a user has gestured a letter "B" on a smartphone's touchscreen and the letter "B" is one of the confirmed gestures stored on the smartphone, the smartphone unlocks to allow user access. Otherwise, the device remains locks and the device may offer alternative authentication means to the user.

If an authentication is successful, the device, without requiring additional user input, places the computing device in an active mode (step 212).

Upon a successful authentication, the device, without requiring additional user input, also selects an application, from a plurality of different applications, according to the gesture, and launches the application on the device (step 214). For example, based on the same letter "B" gesture, the smartphone searches against a gesture-application mapping table that maps user gestures to user-designated applications, and determines that the letter "B" gesture identifies a particular application, which the devices next launches.

In some implementations, after launching an application, the device automatically provides input to the application based on the detected intentional user gesture. In other words, the single intentional user gesture detected not only serves authentication and application shortcut purposes, but also serves as an input to an application launched at the step 214. In some implementations, if the intentional user gesture matches a predefined shape, e.g., a rectangle shape or a triangle shape, the process 200 optionally includes selecting the application, from a plurality of different applications, in accordance with the predefined shape. For example, based on a triangle-shape gesture, the smartphone searches against a gesture-application table that maps user gestures to designated applications, and determines that the triangle-shape gesture identifies a map application on the smartphone, and launches the map application without requiring the user to provide any additional inputs as to which application to launch.

In some implementations, when a gesture-based authentication fails, the device provides an alternative authentication means (step 210). For example, when the computing device determines that an intentional user gesture is insufficient to authenticate a user, the computing device promotes the user to manually provide a password or a fingerprint, and attempts to authenticate the user based on these inputs (step 216).

In some cases where a gesture-based authentication fails, the device reuses information identified in the single intentional gesture for further authentication, reducing the total amount of user input required for further authentications.

For example, when a smartphone obtains, from a user, a number "4" gesture, but determines that the number "4" gesture (e.g., alone) does not suffice to authenticate the user, the smartphone provides a password-based authentication that requires a 2-digit passcode, and provides the number "4" as the first digit of the 2-digit passcode. These techniques are advantageous, as required user inputs are reduced, even in an event of an unsuccessful gesture-based authentication.

In some implementations, the devices enables gesturing in an alternative authentication means.

For example, after invoking a password-based alternative authentication, the device continues to accept user gesture and provides corresponding input (e.g., symbols or numbers) to the password-based authentication. To continue with the above example, after providing the number "4" as the first digit of the 4-digit passcode, the smartphone detects a gesture having a number "6" shape and accordingly provides the number "6" as the second digit of the 2-digit passcode. The smartphone can continue the password-based authentication by attempting to authenticate the user based on the 2-digit passcode "46."

In some implementations, the devices reuses information capture in a gesture in an alternative authentication means.

For another example, after invoking a fingerprint-based alternative authentication, the computing device reuses a fingerprint characteristic included in the detected intentional user gesture and provides the fingerprint characteristic to the fingerprint-based alternative authentication. For example, if a gesture includes a pattern (e.g., arch, loop, and whorl) of a user's index finger, the computing device can capture and provide the characteristic as part of the input to the fingerprint authentication.

An authenticated user can customize gestures for user authentication and application launching. For example, a user may designate a "B" shape gesture as sufficient to unlock a smartphone and launching an email app on the smartphone. In these ways, an authenticated user can modify confirmed gestures or symbols stored on a mobile device, which in turn modifies subsequent gesture-based authentication process and application launching process.

FIG. 3 is a flow diagram illustrating an example process 300 for detecting and disregarding accidental gesture based on predefined criteria.

For convenience, the process 300 will be described as being performed by a computing device having one or more processors and memory for storing executable instruction for execution by the one or more processors. For example, the device 400 shown in FIG. 4, appropriately programmed in accordance with this specification, can perform the process 300.

In some cases, to determine whether a detected user gesture is an accidental gesture or an intentional gesture, a device identifies a first characteristic associated with a user gesture (step 302) and optionally a second characteristic associated with a device (step 304).

In some cases, the device 300 analyzes one or more of the following characteristics associated with a user gesture: the number of touches included in the gesture, the type of the gesture (e.g., swipe, release, and release), the on-touch-screen locations where the gesture occurred/covered, the acceleration magnitude of the gesture, the size (e.g., in terms of the number of pixels) of the gesture, the amount of pressure exerted on the touchscreen by the gesture, the distance and width covered by the gesture, the duration of the gesture, the number of simultaneous finger-touches included in the gesture, and if the gesture includes multiple strokes, the proximity of two (e.g., consecutive) strokes, In some cases, the device optionally analyzes one or more of the following the characteristics associated with the computing device when a user gesture is detected: the computing device's orientation, the computing device's tilt angle (e.g., vertically or horizontally), the computing device's speed of movement, and the computing device's acceleration magnitude.

Based on one or more of these gesture- and device-related characteristics, the device then determines whether the user gesture is an intentional gesture (step 306). For example, the computing device determines the likelihood (L) of a gesture being an intentional gesture by assigning a weight (Wi, e.g., ranging from 0 to 1) to each of the analyzed characteristics (Ci, e.g., with values normalized ranging from 0 to 1) and calculating a weighted total L. In some implementations, L=Total over i of (Wi×Ci), where i=1 to the total number of characteristics analyzed. In some cases, the device classifies a gesture having a weighted total L equal to or more than a predefined value, as an intentional gesture and every other gesture as an accidental gesture.

After classifying a detected gesture as an intentional gesture, the device attempts to authenticate the user providing the gesture based on one or more characteristics associated with the gesture.

In some implementations, a user authentication process includes calculating the probability (P(u(g)) that a user providing the gesture is an authorized user as identified by a confirmed gesture stored on the computing device as follows:

$$P(u(g) = u^* \mid g, G^*) = \sum_{s \in S} P(u(g) = u^* \mid g, s, G^*)P(s \mid g).$$

Here, S represents a set of symbols (e.g., "4"; "A"; "a"; "×"; and "◁"); G represents the set of confirmed gestures (provided by one or more authenticated users) identifying the set of symbols; and P (s|g) is calculated using a user-independent gesture recognition module, e.g., a handwriting recognition module.

In some implementations, the probability (P (u(g)) is calculated as follows:

$$P(u(g)=u^* \mid g, G^*)=\max_{g_i \in G_s} P(u(g)=u(g_i) \mid s)$$

Here, $$P(u(g)=u(g_i) \mid s)$$

is the probability that two gestures identifying a same symbol (e.g., "4"; "A"; "a"; "×"; and "◁") are provided by a same user.

Figure 4:
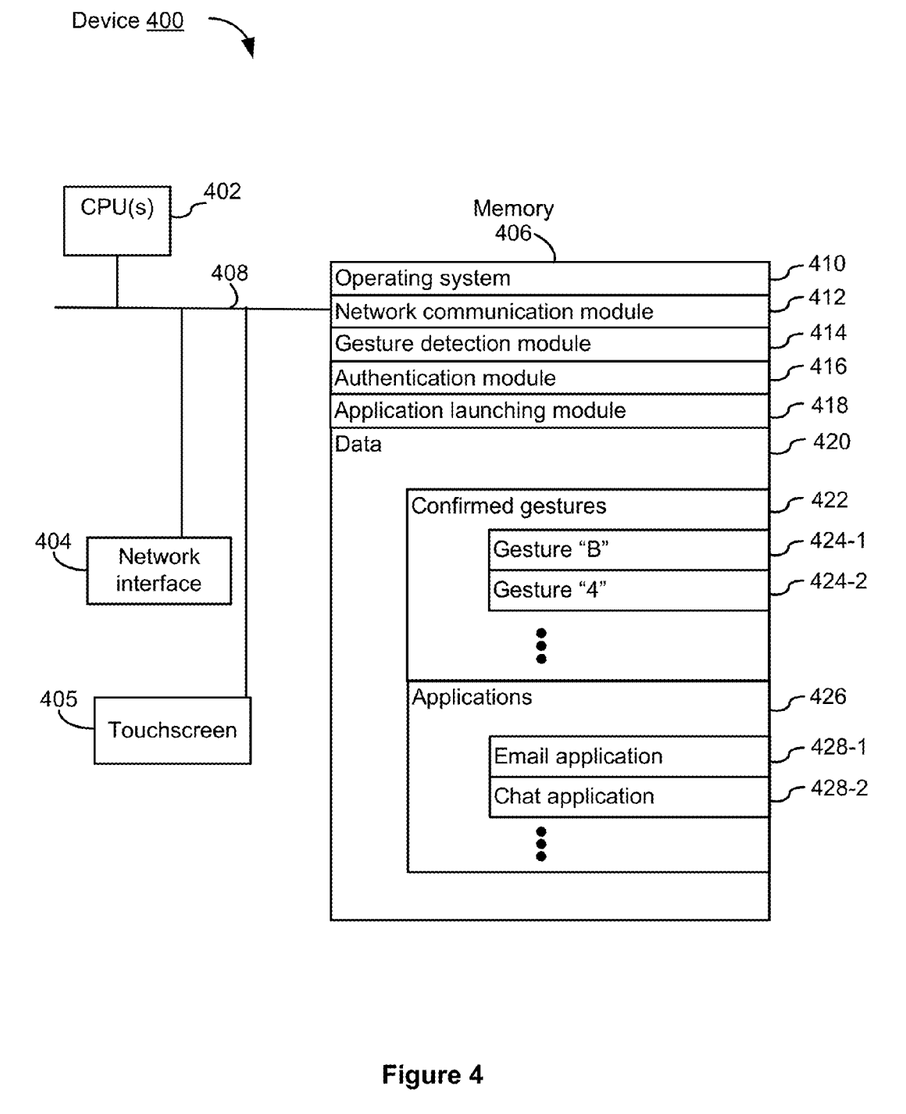
FIG. 4 is a block diagram of an example device.

FIG. 4 is a block diagram of an example computing device 400. The user authentication and application launching technologies described in this specification can be implemented on the computing device 400.

The device 400 typically includes one or more processing units CPU(s) 402 (also referred to as processors), one or more network interfaces 404, memory 406, and one or more communication buses 408 for interconnecting these components. The communication buses 408 optionally include circuitry (sometimes called a chipset) that interconnects and controls communications between system components. The memory 406 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. The memory 406 optionally includes one or more storage devices remotely located from CPU(s) 402. The memory 406, or alternatively the non-volatile memory device(s) within the memory 406, comprises a non-transitory computer readable storage medium. In some implementations, the memory 406 or alternatively the non-transitory computer readable storage medium stores the following programs, modules and data structures, or a subset thereof:

an operating system 410, which includes procedures for handling various basic system services and for performing hardware dependent tasks;

a network communication module (or instructions) 412 for connecting the device 400 with other devices (e.g., one or more server computers) via the one or more network interfaces 404 (wired or wireless);

a gesture detection module 416 for detecting user gestures on the touchscreen 405 and classifying a detected user gesture as either an accidental gesture or an intentional gesture;

an authentication module 418 for authenticating a user on the device 400 (e.g., unlocking the device) in accordance with a detected intentional user gesture;

an application launching module 418 for selecting, among several different applications, an application in accordance with a detected intentional user gesture and launching the application on the device; and data 420 stored on the device, which include:
one or more confirmed gestures 422, e.g., a two-finger gesture having a letter "B" shape or a single-finger gesture having a number "4" shape; and
a set of different applications 426, such as an email application 428-1 and a chat application 428-2.

In some implementations, the gesture detection module 414 maintains the touchscreen 405 in an active mode to detect user gestures, when other components of device 400 (e.g., the authentication module 416 and the application launching module 418) are in a sleep or standby model. In some implementations, unless a successful authentication occurs, the gesture detection module 414 maintains the touchscreen 405 in a blank screen mode, e.g., to consume less power.

In some implementations, one or more of the above identified elements are stored in one or more of the previously mentioned memory devices, and correspond to a set of instructions for performing a function described above. The above identified modules or programs (e.g., sets of instructions) need not be implemented as separate software programs, procedures or modules, and thus various subsets of these modules may be combined or otherwise re-arranged in various implementations. In some implementations, the memory 306 optionally stores a subset of the modules and data structures identified above. Furthermore, the memory 306 may store additional modules and data structures not described above.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:
   detecting, by a device having a touchscreen, a first gesture by a user on the touchscreen while the device is in a sleep mode;
   classifying the first gesture, by the device, as an intentional gesture or an accidental gesture and either (i) maintaining the device in the sleep mode if the first gesture is classified as an accidental gesture, or (ii) determining, by the device, whether the first gesture matches one or more confirmed gestures stored on the device if the first gesture is classified as an intentional gesture; and,
   if the first gesture is classified as an intentional gesture, either (i) requiring an additional user input to authenticate the user if the first gesture does not match one or more confirmed gestures stored on the device, or (ii) recognizing the user as authenticated and selecting and launching an application from a plurality of applications on the device according to the first gesture, if the first gesture matches one or more confirmed gestures stored on the device, without requiring any user input in addition to the first gesture to authenticate the user or select and launch the application.

2. The method of claim 1, further comprising:
   identifying the gesture as a drawing of an alphanumeric character on the touchscreen, the alphanumeric character having an alphanumeric value; and
   providing the alphanumeric value as an input to the application.

3. The method of claim 1, further comprising:
   in accordance with a determination that the gesture is classified as an intentional gesture and the gesture fails to match one or more confirmed gestures stored on the device:
   presenting, to the user, a password-based authentication mechanism; and
   requiring the user to input a password.

4. A computing device comprising:
   one or more processors;
   a touchscreen; and,
   one or more storage units storing instructions that when executed by the one or more processors cause the computing device to perform operations comprising:
   detecting, by a device having a touchscreen, a first gesture by a user on the touchscreen while the device is in a sleep mode;
   classifying the first gesture, by the device, as an intentional gesture or an accidental gesture and either (i) maintaining the device in the sleep mode if the first gesture is classified as an accidental gesture, or (ii) determining, by the device, whether the first gesture matches one or more confirmed gestures stored on the device if the first gesture is classified as an intentional gesture; and,
   if the first gesture is classified as an intentional gesture, either (i) requiring an additional user input to authenticate the user if the first gesture does not match one or more confirmed gestures stored on the device, or (ii) recognizing the user as authenticated and selecting and launching an application from a plurality of applications on the device according to the first gesture, if the first gesture matches one or more confirmed gestures stored on the device, without requiring any user input in addition to the first gesture to authenticate the user or select and launch the application.

5. The device of claim 4, wherein the operations further comprise identifying the first gesture as a drawing of an alphanumeric character on the touchscreen, the alphanumeric character having an alphanumeric value.

6. The device of claim 5, wherein the operations further comprise:
   providing the alphanumeric value as an input to the application.

7. The device of claim 4, wherein the operations further comprise:
   in accordance with a determination that the gesture is classified as an intentional gesture and the gesture fails to match one or more confirmed gestures stored on the device:
   presenting, to the user, a password-based authentication mechanism; and
   requiring the user to input a password.

8. The device of claim 4, wherein the operations further comprise:
  collecting an intentional gesture from a user who has been authenticated; and
  identifying the intentional gesture as a confirmed gesture.

9. The device of claim 4, wherein the operations further comprise:
  while detecting the gesture on the touchscreen while the device is in a sleep mode, displaying a visual aid tracing the gesture on the touchscreen at a reduced power consumption level.

10. A non-transitory computer storage medium encoded with a computer program, the computer program comprising instructions that when executed by a computing device having a touchscreen cause the computing device to perform operations comprising:
  detecting, by a device having a touchscreen, a first gesture by a user on the touchscreen while the device is in a sleep mode;
  classifying the first gesture, by the device, as an intentional gesture or an accidental gesture and either (i) maintaining the device in the sleep mode if the first gesture is classified as an accidental gesture, or (ii) determining, by the device, whether the first gesture matches one or more confirmed gestures stored on the device if the first gesture is classified as an intentional gesture; and,
  if the first gesture is classified as an intentional gesture, either (i) requiring an additional user input to authenticate the user if the first gesture does not match one or more confirmed gestures stored on the device, or (ii) recognizing the user as authenticated and selecting and launching an application from a plurality of applications on the device according to the first gesture, if the first gesture matches one or more confirmed gestures stored on the device, without requiring any user input in addition to the first gesture to authenticate the user or select and launch the application.

11. The non-transitory computer storage medium of claim 10, wherein the operations further comprise:
  identifying the first gesture as a drawing of an alphanumeric character on the touchscreen, the alphanumeric character having an alphanumeric value.

12. The non-transitory computer storage medium of claim 11, wherein the operations further comprise:
  providing the alphanumeric value as an input to the application.

13. The non-transitory computer storage medium of claim 10, wherein the operations further comprise:
  in accordance with a classification of the first gesture as an intentional gesture and a determination that the first gesture matches one or more confirmed gestures stored on the device:
    determining, by the device, that the device is in a locked mode; and,
    without requiring any additional user input, unlocking the device.

14. The non-transitory computer storage medium of claim 10, wherein the operations further comprise:
  identifying the first gesture as a drawing of a predefined shape on the touchscreen.

15. The non-transitory computer storage medium of claim 10, wherein the operations further comprise:
  in accordance with a classification of the first gesture as an intentional gesture and a determination that the first gesture does not match one or more confirmed gestures stored on the device:
    presenting, to the user, a password-based authentication mechanism; and,
    requiring the user to input a password.

16. The non-transitory computer storage medium of claim 15, wherein the operations further comprise:
  determining, by the device, that the first gesture identifies an alphanumeric value or a predefined shape; and,
  automatically providing the alphanumeric value or the predefined shape identified by the first gesture as a first portion of an input to the password-based authentication mechanism.

17. The non-transitory computer storage medium of claim 16, wherein the operations further comprise:
  responsive to detecting an intentional second gesture:
    determining, by the device, that the second gesture identifies a second alphanumeric value or a second predefined shape on the touchscreen; and,
    automatically providing the second alphanumeric value or the second predefined shape as a second portion of the input to the password-based authentication mechanism.

18. The non-transitory computer storage medium of claim 17, wherein the operations further comprise:
  authenticating the user in accordance with the first portion of the input and the second portion of the input.

19. The non-transitory computer storage medium of claim 10, wherein the operations further comprise:
  in accordance with a classification of the first gesture as an intentional gesture and a determination that the first gesture does not match one or more confirmed gestures stored on the device:
    determining that the first gesture includes a fingerprint characteristic of the user;
    presenting, to the user, a fingerprint-based authentication mechanism; and,
    providing the fingerprint characteristic included in the first gesture as part of an input to the fingerprint-based authentication mechanism.

20. The non-transitory computer storage medium of claim 10, wherein the operations further comprise:
  in accordance with a classification of the first gesture as an intentional gesture and a determination that the first gesture does not match one or more confirmed gestures stored on the device:
    maintaining the device in the sleep mode by:
      maintaining a blank screen on the touchscreen, and,
      maintaining one or more electronic components of the device other than the touchscreen in the sleep mode.

21. The non-transitory computer storage medium of claim 10, wherein the operations further comprise:
  while detecting the first gesture on the touchscreen while the device is in a sleep mode, displaying a visual aid tracing the first gesture on the touchscreen at a reduced power consumption level.

22. The non-transitory computer storage medium of claim 10, wherein classifying the first gesture as an intentional gesture or an accidental gesture is based at least in part on an orientation and an acceleration of the device when the first gesture occurs and on a duration of the first gesture on the touchscreen.

* * * * *